US009643841B2

(12) United States Patent
Akyildiz et al.

(10) Patent No.: US 9,643,841 B2
(45) Date of Patent: May 9, 2017

(54) GRAPHENE-BASED PLASMONIC NANO-ANTENNA FOR TERAHERTZ BAND COMMUNICATION

(71) Applicants: Ian F. Akyildiz, Alpharetta, GA (US); Josep Miquel Jornet, Buffalo, NY (US)

(72) Inventors: Ian F. Akyildiz, Alpharetta, GA (US); Josep Miquel Jornet, Buffalo, NY (US)

(73) Assignee: Georgia Tech Research Corporation, Atlanta, GA (US)

( * ) Notice: Subject to any disclaimer, the term of this patent is extended or adjusted under 35 U.S.C. 154(b) by 437 days.

(21) Appl. No.: 14/253,539

(22) Filed: Apr. 15, 2014

(65) Prior Publication Data

US 2016/0218434 A1    Jul. 28, 2016

Related U.S. Application Data

(60) Provisional application No. 61/812,872, filed on Apr. 17, 2013.

(51) Int. Cl.
*H01Q 1/38* (2006.01)
*B82B 3/00* (2006.01)
*B82Y 10/00* (2011.01)

(52) U.S. Cl.
CPC ............ *B82B 3/0038* (2013.01); *B82Y 10/00* (2013.01); *H01Q 1/38* (2013.01); *Y10S 977/95* (2013.01)

(58) Field of Classification Search
CPC ........ H01Q 9/42; B82Y 10/00; B82B 3/0038; Y10S 977/95

USPC .......................................... 343/700 MS, 909
See application file for complete search history.

(56) References Cited

U.S. PATENT DOCUMENTS

| 8,554,022 | B1* | 10/2013 | Hochberg | H01L 29/66977 257/21 |
| 2008/0170982 | A1* | 7/2008 | Zhang | B82Y 10/00 423/447.3 |
| 2015/0380355 | A1* | 12/2015 | Rogers | H01L 23/538 257/773 |
| 2016/0227639 | A1* | 8/2016 | Kaminer | H05G 2/008 |

OTHER PUBLICATIONS

Jornet, J.M.; "CHannel Modeling and Capacity Analysis for Electromagnetic Wireless Nanonetworks in the Terahertz Band"; IEEE Transactions of Wireless Communications, vol. 10, No. 10; Oct. 2011.

* cited by examiner

*Primary Examiner* — Hoanganh Le
(74) *Attorney, Agent, or Firm* — Bryan W. Bockhop; Bockhop Intellectual Property Law, LLC

(57) ABSTRACT

An antenna system includes an elongated conductive plane and an elongated dielectric layer that is disposed on the conductive plane. An elongated graphene nanoribbon is disposed along an axis and is coupled to the dielectric layer at a graphene/dielectric interface. A feeding mechanism is coupled to the conductive plane. The feeding mechanism is configured to accept a signal that excites surface plasmon polariton waves at the graphene/dielectric interface. In a method of making a surface plasmon polariton wave antenna, an elongated conductive plane is formed. An elongated dielectric layer is applied on a surface of the conductive plane. An elongated graphene nanoribbon is applied to the dielectric layer. A signal source is coupled to the elongated conductive plane.

12 Claims, 2 Drawing Sheets

GRAPHENE-BASED PLASMONIC NANO-ANTENNA FOR TERAHERTZ BAND COMMUNICATION

CROSS-REFERENCE TO RELATED APPLICATION(S)

This application claims the benefit of U.S. Provisional Patent Application Ser. No. 61/812,872, filed Apr. 17, 2013, the entirety of which is hereby incorporated herein by reference.

BACKGROUND OF THE INVENTION

1. Field of the Invention

The present invention relates to nano-scale antennas and, more specifically, to a plasmonic nano-scale antenna.

2. Description of the Related Art

An antenna converts an electrical signal into a transmission of radio waves and converts radio waves into an electrical signal. Most antennas operate at the macro scale and are used for communications between conventional radio-frequency transceivers.

Nanotechnology is providing a new set of tools to the engineering community to design and eventually manufacture novel electronic components that may be no more than a few cubic nanometers in size and that will be able to perform specific functions, such as computing, data storing, sensing and actuation. The integration of several nano-components into a single entity, just a few cubic micrometers in size, will enable the development of more advanced nano-devices. By means of communication, these nano-devices will be able to achieve complex tasks in a distributed manner. The resulting nano-networks will enable unique applications of nanotechnology in the biomedical, industrial, environmental and military fields, such as advanced health monitoring and drug delivery systems, or wireless nanosensor networks for biological and chemical attack prevention.

Currently, enabling the communication among nano-devices is still a mostly unsolved challenge. The miniaturization of a classical antenna to meet the size requirements of nano-devices would impose very high radiation frequencies. For example, a one-micrometer-long dipole antenna would resonate at approximately 150 THz. The available transmission bandwidth increases with the antenna resonant frequency, but so does the propagation loss. Due to the expectedly very limited power of nano-devices, the feasibility of nanonetworks would be compromised if this approach were followed. In addition, it is not yet clear how a miniature transceiver could be engineered to operate at these very high frequencies. Moreover, intrinsic material properties of many common metals remain unknown at the nanoscale and, thus, common assumptions in antenna theory, such as the ideal perfect electric conductor (PEC) behavior of the antenna building components, appear not to hold in this realm.

Alternatively, the use of nanomaterials to fabricate miniature antennas may help to overcome these limitations. In one example, graphene, i.e., a one-atom thick layer of carbon atoms in a honeycomb crystal lattice, has attracted the attention of the scientific community due to its unique electronic and optical properties. The conductivity of graphene has been studied both for DC and for frequencies that range from the Terahertz Band (0.1-10 THz) up to the visible spectrum. In particular, it has been shown that it drastically changes with the dimensions or the chemical potential. For example, the infrared conductivity of infinitely large two-dimensional graphene sheets at zero chemical potential has been found to be essentially independent of frequency and equal to $\sigma 0 = \pi e2/2h$ (where e refers to the electron charge and h refers to the Planck constant). Also, it has been recently shown that the lateral confinement of electrons in semi-finite-size graphene nanoribbons (GNRs) enhances the material conductivity in the Terahertz Band.

In accordance to its conductivity, the propagation of surface plasmon polariton (SPP) waves on doped graphene has been recently analytically studied and experimentally proved. SPP waves are confined EM waves coupled to the surface electric charges at the interface between a metal and a dielectric material. Many metals support the propagation of SPP waves, but usually at very high frequencies (e.g., near-infrared and optical frequency bands). In addition, the propagation of SPP waves even on noble metals, which are considered the best plasmonic materials, exhibit large Ohmic losses and cannot be easily tuned. On the other hand, SPP waves on graphene have been observed at frequencies as low as in the Terahertz Band and, in addition, these can be tuned by means of material doping.

Therefore, there is a need for an antenna that facilitates communication between nano-scale devices.

SUMMARY OF THE INVENTION

The disadvantages of the prior art are overcome by the present invention which, in one aspect, is an antenna system, that includes an elongated conductive plane and an elongated dielectric layer that is disposed on the conductive plane. An elongated graphene nanoribbon is disposed along an axis and is coupled to the dielectric layer at a graphene/dielectric interface. A feeding mechanism is coupled to the conductive plane. The feeding mechanism is configured to accept a signal that excites surface plasmon polariton waves at the graphene/dielectric interface.

In another aspect, the invention is a communication system that includes an elongated conductive plane. An elongated dielectric layer is disposed on the conductive plane. An elongated graphene nanoribbon is disposed along an axis and is coupled to the dielectric layer at a graphene/dielectric interface. A feeding mechanism is coupled to the conductive plane. A signal source is coupled to the feeding mechanism and is configured apply energy to the conductive plane so as to excite surface plasmon polariton waves at the graphene/dielectric interface.

In yet another aspect, the invention is a method of making a surface plasmon polariton wave antenna, in which an elongated conductive plane is formed. An elongated dielectric layer is applied on a surface of the conductive plane. An elongated graphene nanoribbon is applied to the dielectric layer. A signal source is coupled to the elongated conductive plane.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
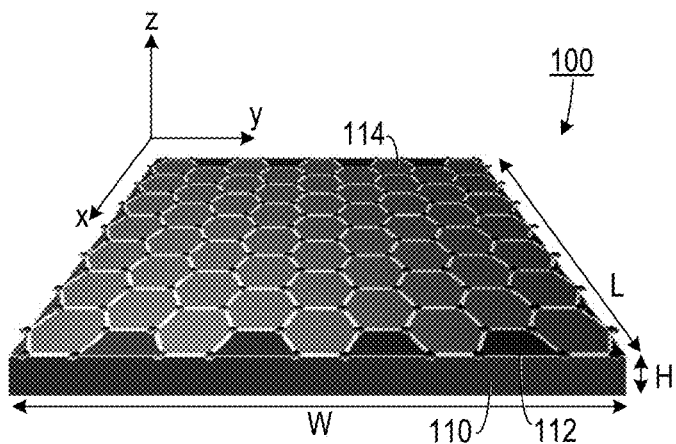
FIG. 1A is a perspective view of a graphene-based plasmonic nanoantenna.
Figure 1B:
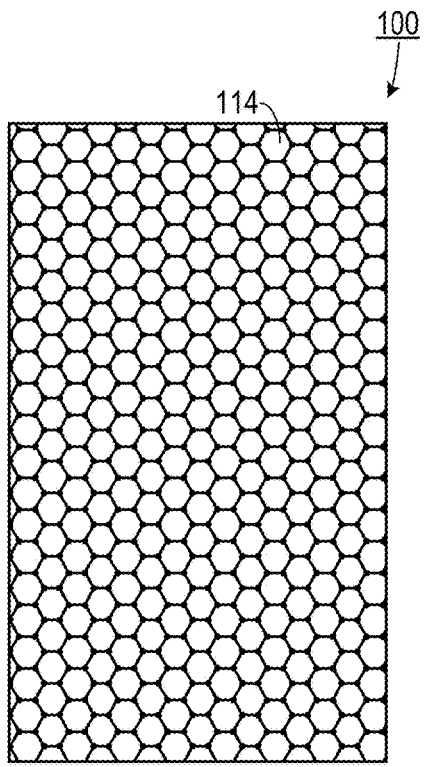
FIG. 1B is a plan view of the embodiment shown in FIG. 1.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1C:
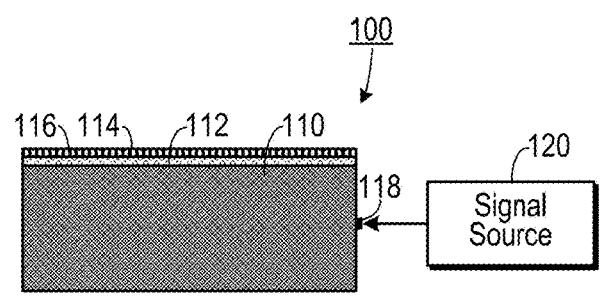
FIG. 1C is an elevational view of the embodiment shown in FIG. 1.

As shown in FIG. 11B, one embodiment of an antenna 100 includes an elongated conductive plane 110 that includes a material that is conductive to a signal with a frequency in a terahertz band, such as gold or platinum (or combinations thereof). An elongated dielectric layer 112 is disposed on the conductive plane 110. The dielectric layer 112 can include any material that acts as a dielectric with respect to signals in terahertz frequency band. An elongated graphene nanoribbon 114 is disposed along the elongated axis (e.g., the x-axis) of the conductive plane 110 and the dielectric layer 112, and is coupled thereto at a graphene/dielectric interface 116. (The graphene nanoribbon 114 can have either an "armchair" orientation or a "zigzag" orientation, or an orientation that is between the two.) As shown in FIG. 1C, a signal source 120 is coupled to the conductive plane 110. When a terahertz signal is applied by the signal source 120 to the conductive plane 110, surface plasmon polariton waves are excited at the graphene/dielectric interface 116.

In some embodiments, the graphene nanoribbon 114 can be doped with a dopant to tune the antenna 100 to a predetermined surface plasmon polariton wave frequency. Any one of several different dopants can be selected, depending on the specific requirements of the antenna 100.

In one experimental embodiment, the nano-antenna 100 includes a graphene nanoribbon (GNR) 114 as the active element, mounted over a metallic flat surface ground plane 110, with a dielectric material layer 112 in between, which is used both to support the GNR 114 as well as to change its chemical potential by means of material doping. In the complete model, an ohmic contact or a mechanism 118 to feed the antenna is necessary.

The working principle of the nano-antenna 100 is as follows. For simplicity, we explain first the device functioning in reception mode. Consider an incident EM plane wave, $E_{INC}$, given by:

$$\vec{E}_{inc}(z,t) = E_0 e^{i(-k_1 z + \omega t)} \hat{\alpha}, \tag{1}$$

where $E_0$ is the field amplitude, $k_1$ is the propagation constant in medium 1 (above the GNR), -z is the propagation direction (perpendicular to the GNR), $\omega$ is the angular frequency, t stands for time and $\alpha = x,y$ is the wave polarization. When $E_{inc}$ irradiates the antenna, it excites the free electrons on the graphene layer. The electronic response of the graphene layer to an EM field is given by its dynamic complex conductivity, $\sigma$. The conductivity of the GNR depends on the GNR edge geometry, width and chemical potential, and the incident field polarization $\alpha$.

At the interface between the graphene layer and the dielectric material layer, surface plasmon polariton (SPP) waves are excited. The SPP wave modes that can be supported on the GNR and their dynamic complex wave vector $k_{spp}$ depend on the real and imaginary part of the dynamic complex conductivity, $\sigma$.

By exploiting the high mode compression factor of SPP waves in GNRs, graphene-based plasmonic nano-antennas can be developed. The main difference between conventional PEC antennas and plasmonic antennas is the fact that the SPP current wave propagates with a much larger wave vector than conventional electric current waves in PEC antennas.

According to the antenna reciprocity theorem, the behavior of the nano-antenna in transmission can similarly be explained as follows. Consider a time-varying electric current, J:

$$\vec{J}(z,t) = J_0 e^{i\omega t} \delta(z-h) \hat{\alpha} \tag{2}$$

where $J_0$ is the current amplitude, $\omega$ is the angular frequency, t stands for time, $\delta$ stands for the Dirac delta function, h is the z coordinate of the GNR, i.e., the separation between the ground plane and the GNR itself, and corresponds to the feeding point, and $\alpha = x,y$ is the current direction. When J excites the graphene layer, an SPP wave is generated at the interface with the dielectric material layer. If the length of the graphene patch corresponds to integer number of half plasmon wavelengths, $\lambda_{spp}$, the plasmonic antenna resonates, and the antenna radiated EM field is maximized. Ultimately, the frequency response and efficiency of nano-antennas depends on the properties of SPP waves, which on their turn depend on the conductivity of GNRs.

Conductivity of Graphene Nanoribbons. In this section, we analytically and numerically investigate the conductivity of GNRs. For this, first, we recall the electronic band structure and the electron wave functions of GNRs, and, then, we use the Kubo formalism to study the conductivity of GNRs as a function of their width and chemical potential.

Figure 2A:
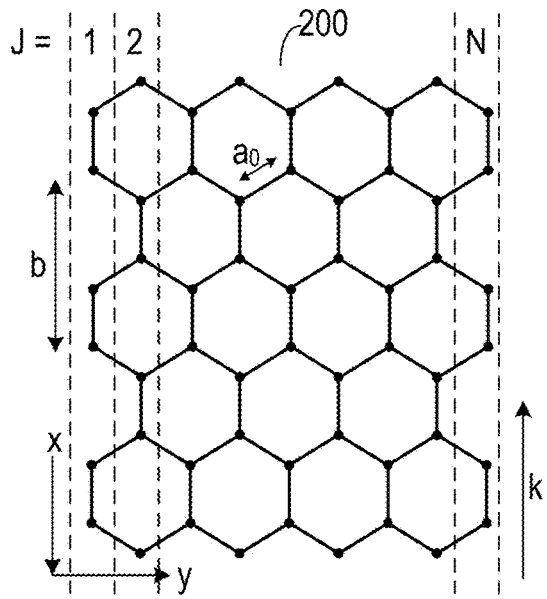
FIG. 2A is a plan view of a portion of a graphene nanoribbon.

Electronic Band Structure and Electron Wave Functions. Referring to FIG. 2A, the electronic band structure of a GNR, which describes the energy values that an electron is allowed or forbidden to have, depends on the geometry across its long edge. This example focuses on armchair GNRs (AGNRs), but a similar results can be achieved using zigzag GNRs (ZGNRs), with or without defects. The electronic band structure $\in$ in electron-volts (eV) of an AGNR is given by:

$$\varepsilon^s(k, \theta) = st\sqrt{1 + 4\cos^2\theta + 4\cos\theta\cos\left(\frac{kb}{2}\right)}, \tag{3}$$

where s is the band index (s=1 for the conduction band, s=-1 for the valence band), t≈3 eV is the nearest-neighbor atom interaction in the tight-binding model of graphene, k and $\Theta$ are the wave vectors parallel and perpendicular to the AGNR edge, respectively, and $b=3a_0$, where $a_0=0.142$ nm is the graphene lattice constant. The Brillouin zone, i.e., the area of interest in the wave vector domain, is the region defined by the values of $kb \in (0,\pi)$ and $\Theta \in (0,\pi)$. The conduction and the valence bands touch at the point $(k,\Theta)=(0,2\pi/3)$, which is referred to as the Dirac point.

Due to the finite width W of the AGNR, the values of $\Theta$ are quantized. In particular, by defining the AGNR width as $W=\sqrt{3}/2 a_0 (N-1)$, with N being the number of single-atom columns across the AGNR 200 width (see FIG. 2A), the values of $\Theta$ are given by:

$$\Theta_n = \frac{n\pi}{N+1}, \quad (4)$$

where n=1,2, ..., N stands for the band index. By considering the GNR length L much larger than its width, the wave vector k is treated as a continuous variable. In our analysis, L is in the order of several hundreds of nanometers and up to one micrometer, and L>>W.

The wave functions $\Phi_J^s$ in an AGNR are given by:

$$\phi_J^s(k, \theta_n) = \frac{1}{\sqrt{N}} e^{-jk} \frac{b}{2}(J-1)\sin J\theta_n \begin{pmatrix} e^{-i\Theta(k,\delta_n)} \\ s \end{pmatrix}, \quad (5)$$

where J=1,2, ..., N is the single-atom column index across the AGNR width and $\tau$ is the polar angle between k and $\Theta_n$ defined with respect to the Dirac point and it is given by $$\Theta(k, \theta_n) = \operatorname{atan}\left(\frac{kb}{\theta_n - \frac{2\pi}{3}}\right), \quad (6)$$

where a tan refers to the inverse trigonometric tangent function and $\Theta_n$ is defined as in equation (4).

Figure 2B:
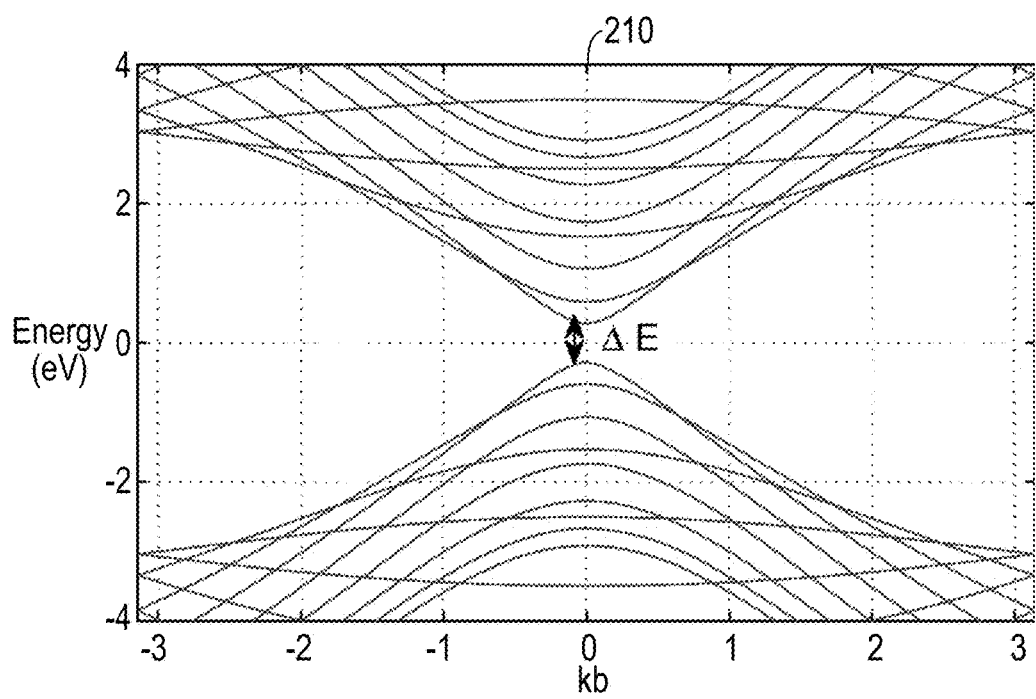
FIG. 2B is an energy band diagram corresponding to the portion of the graphene nanoribbon shown in FIG. 2A.

As shown in FIG. 2B, the energy band structure $\in$ of an AGNR 210, given by equation (3), with width W≈2.1 nm (N=18) is shown. For this width, the AGNR has a semiconducting behavior, i.e., there is a gap between the valence and the conduction bands. The energy bandgap $\Delta E$ in AGNRs depends on N and is given in eV by $$\Delta E = \begin{cases} 0; & N = 3m-1; \\ -2t\left[1 + \cos\left(\frac{2m+1}{3m+1}\pi\right)\right]; & N = 3m; \\ -2t\left[1 + \cos\left(\frac{2m+1}{3m+2}\pi\right)\right]; & N = 3m+1; \end{cases} \quad (7)$$

where m=1,2, .... As we show next, the energy bandgap $\Delta E$ plays a major role in the conductivity of thin AGNRs. The following nomenclature is used for simplicity:

$\in_n^s = \in^s(k, \theta_n), \Theta^n = \Theta(k, \theta_n)$.

Dynamical Complex Conductivity. The dynamical complex conductivity of AGNRs is computed next by means of the Kubo formalism. We do not make any simplifying assumption on the energy band structure of AGNRs, temperature or chemical potential. Simply stated, we compute the conductivity by counting all the allowed electron transitions in the energy band structure.

The dynamical complex conductivity σ of AGNRs depends on the polarization of the incident electromagnetic field ($\alpha$=x,y), and it is given by:

$$\sigma_{\alpha\alpha}(f) = i\frac{\hbar e^2}{S} \sum_{l,\varepsilon'} \sum_{n,m} \int_k \frac{(n_F(\varepsilon_m^{s'}) - n_F(\varepsilon_n^s))}{(\varepsilon_n^s - \varepsilon_m^{s'})} \frac{|\langle \phi_m^{s'} | v_\alpha | \phi_n^s \rangle|^2}{(\varepsilon_n^s - \varepsilon_m^{s'} + hf - iv)} dk, \quad (8)$$

where f stands for frequency in Hz, $\hbar$ is the reduced Planck constant in eV·s, e is the electron charge in C, S is the area of the reference unit structure, {s,s'} stand for band indexes, {n,m} refer to the sub-bands indexes, k is the wave vector parallel to the AGNR edge, $n_F$ is the Fermi-Dirac distribution given by:

$$n_F(\varepsilon) = \frac{1}{1 + e^{\frac{\varepsilon-\mu}{k_B T}}}s, \quad (9)$$

where $\mu$ is the chemical potential in eV, $k_B$ is the Boltzmann constant in eV/K, and T stands for the temperature in K. $\langle \phi_m^{s'} | v_\alpha \hat{E} | \phi_n^s \rangle$ is the matrix element of the a component of the velocity operator for the transition from the energy state {s,n} to the energy state {s',m}. The matrix elements are classified into inter-band transitions (s≠s') and intra-band transitions (s=s'). The matrix elements of velocity operator for intra-band transitions in AGNRs are given by:

$$\langle \varphi_m^c | v_x \hat{E} | \varphi_n^c \rangle = \begin{cases} 0; & m-n \in \text{even}; \\ -i\frac{2}{\pi} \frac{v_F}{m-n} \langle \zeta_x \rangle_{m,n} & m-n \in \text{odd}; \end{cases} \quad (10)$$

$$\langle \varphi_m^c | v_x \hat{E} | \varphi_n^c \rangle = \delta_{m,n} v_F \langle \zeta_y \rangle_{m,n}, \quad (11)$$

where $v_F$=tb/(2$\hbar$) is the Fermi velocity, $\delta_{m,n}$ refers to the Kronecker delta, and $\langle \zeta_\alpha \rangle$ ($\alpha$=x,y) stands for the Pauli matrixes, whose elements are given by:

$$\langle \zeta_x \rangle_{m,n} = \frac{1}{2}(e^{i\tau^m} + e^{-i\tau^n}), \langle \zeta_y \rangle_{m,n} = \frac{-i}{2}(e^{i\tau^m} + e^{-i\tau^n}), \quad (12)$$

and the polar angle $\tau^n$ is defined in equation (6). Similarly, the matrix elements of velocity operator for inter-band transitions in AGNRs are given by:

$$\langle \varphi_m^c | v_x \hat{E} | \varphi_n^v \rangle = \begin{cases} 0; & m-n \in \text{even}; \\ -\frac{2}{\pi} \frac{v_F}{m-n} \langle \zeta_y \rangle_{m,n} & m-n \in \text{odd}; \end{cases} \quad (13)$$

$$\langle \varphi_m^c | v_y \hat{E} | \varphi_n^v \rangle = \delta_{m,n} v_F \langle \zeta_x \rangle_{m,n}. \quad (14)$$

Finally, the parameter v in equation (8) refers to the inverse of the relaxation time. Note that in equation (8), when s=s' and m=n, both the numerator and the denominator vanish. However, by using the Taylor expansion of the Fermi-Dirac distribution function, we can rewrite equation (8) for this specific case as $$\sigma_{\alpha\alpha}(f) \approx \quad (15)$$

$$i\frac{\hbar e^2}{S} \sum_{l,\varepsilon'} \sum_{n,m} \int_k \frac{e^{\frac{\varepsilon_m^{s'}-\mu}{k_B T}} n_F(\varepsilon_m^{s'}) n_F(\varepsilon_n^s)}{k_B T} \frac{|\langle \phi_m^{s'} | v_\alpha | \phi_n^s \rangle|^2}{(\varepsilon_n^s - \varepsilon_m^{s'} + hf - iv)} dk.$$

For the characterization of the SPP waves in AGNRs, both the real part and the imaginary part of σ are necessary.

Surface Plasmon Polariton Waves in Graphene Nanoribbons. Surface Plasmon Polariton (SPP) waves are confined EM waves coupled to surface electric charges at the interface between a metal and a dielectric material. Most of the SPP-related research has been focused on the propagation of SPP waves in noble metals, such as gold and silver. These materials support the propagation of SPP waves with high propagation lengths, in the order of a few tens of SPP wavelengths $\lambda_{spp}$. However, noble metals only support SPP waves at frequencies in the infrared and visible frequency region (in the order of several hundreds of Terahertz). On the other hand, graphene supports the propagation of SPP waves at much lower frequencies than the noble metals.

In this section, we analytically compute the dynamic complex wave vector of SPP waves in AGNRs and numerically study their main propagation properties.

Dynamic Complex Wave Vector. The dynamic complex wave vector $k_{spp}$ of SPP waves in graphene determines the propagation properties of SPP waves. $k_{spp}$ strongly depends on the conductivity of the AGNR $\sigma_{\alpha\alpha}$ as well as the permeability $\mu_n$ and permittivity $\epsilon_n$ of the materials surrounding the AGNR. The real part of the wave vector, $$\mathrm{Re}\{k_{spp}\} = \frac{2\pi}{\lambda_{spp}}, \qquad (16)$$

determines the SPP wavelength. The imaginary part of the wave vector $\mathrm{Im}\{k_{spp}\}$ determines the SPP decay or, inversely, $1/\mathrm{Im}\{k_{spp}\}$ determines the SPP propagation length. We proceed next to compute the complex value of $k_{spp}$.

In reception, an a-polarized incident EM plane wave described in equation (1) excites a SPP wave mode on the AGNR, which propagates in the a direction. Two types of SPP modes can be supported by the AGNR depending on its conductivity:

Transverse Magnetic (TM) mode: there is no magnetic field in the direction of propagation, i.e., $H_\alpha = 0$.

Transverse Electric (TE) mode: there is no electric field in the direction of propagation, i.e., $E_\alpha = 0$.

TM Modes. In order to determine the wave vector $k_{spp}$ for TM modes we proceed as follows. The SPP electric field E and magnetic field H are governed by the Maxwell's equations, which can be written in their differential form as:

$$\nabla \times \vec{E} = -\mu_m \frac{\partial \vec{H}}{\partial t}, \quad \nabla \times \vec{H} = \vec{J} + \epsilon_n \frac{\partial \vec{E}}{\partial t}, \qquad (17)$$

where $\nabla \times$ is the curl operator, $\mu_n = \mu_0 \mu_n^r$ is the permeability of medium n (n=1 above the AGNR, n=2 below the AGNR), $\epsilon_n = \epsilon_0 \epsilon_n^r$ is the permittivity of medium n, and J is the current created by the $\alpha$-component of the electric field, $E_{\alpha'}$ given by:

$$\vec{J} = \sigma_{\alpha\alpha} E_\alpha \delta(z-h)\hat{\alpha}, \qquad (18)$$

where $\sigma_{\alpha\alpha}$ is the AGNR conductivity given by equation (8) and h is the z coordinate of the AGNR.

The complex propagation index of TM modes can be found by assuming that the electric field E has the form:

$$\vec{E} = E_1 e^{i(k_{spp}\alpha - k_1(z-h))}\hat{\alpha} + E_2 e^{i(k_{spp}\alpha - k_2(z-h))}\hat{z} \; z \geq h,$$

$$\vec{E} = E_3 e^{i(k_{spp}\alpha + k_2(z-h))}\hat{\alpha} + E_4 e^{i(k_{spp}\alpha - k_2(z-h))}\hat{z} \; z < h, \qquad (19)$$

and the magnetic field H has the form:

$$\vec{H} = H_1 e^{i(k_{spp}\alpha - k_1(z-h))}\hat{\alpha}' \; z \geq h,$$

$$\vec{H} = H_2 e^{i(k_{spp}\alpha + k_2(z-h))}\hat{\alpha}' \; z < h, \qquad (20)$$

where $E_1$, $E_2$, $E_3$, $E_4$, $H_1$ and $H_2$ are constants, $k_{spp}$ is the SPP wave vector, a is the polarization direction, $a' = |\alpha \times z|$ and $k_n$ is the wavevector in medium n given by:

$$k_n = \frac{2\pi}{\lambda_n} = \omega\sqrt{\mu_n \epsilon_n} = \frac{2\pi f}{c_0}\sqrt{\mu_n^r \epsilon_n^r}, \qquad (21)$$

where $\lambda_n$, $\mu_n$, and $\epsilon_n$ are the wavelength, permeability and permittivity of medium n, respectively, $\omega$ stands for the angular frequency f refers to the frequency, and $c_0$ is the speed of light in vacuum. In the rest of the paper, we consider $\mu_n^r = 1$ for both media (n=1 is usually air, and n=2 is a non-magnetic dielectric material).

By inserting equations (19) and (20) in equation (17) and solving for the boundary condition at z=h, which is given by, $$H_{\alpha'}|_{z=h+} - H_{\alpha'}|_{z=h-} = \sigma_{\alpha\alpha} E_\alpha, \qquad (22)$$

the following dispersion equation for TM SPP waves in graphene is found in:

$$\frac{\epsilon_1^r}{\sqrt{k_{spp}^2 - \frac{\epsilon_1^r \omega^2}{c_0^2}}} + \frac{\epsilon_2^r}{\sqrt{k_{spp}^2 - \frac{\epsilon_2^r \omega^2}{c_0^2}}} = -i\frac{\sigma_{\alpha\alpha}}{\omega\epsilon_0}, \qquad (23)$$

where all the parameters have already been defined. A closed-form solution for $k_{spp}$ can only be obtained when considering a single isolated AGNR surrounded by air ($\epsilon_1^r = \epsilon_2^r = 1$), which is not our case. Next, we numerically study the propagation index of TM SPP waves.

TE Modes. The propagation index for TE modes can be obtained by following a similar procedure to that for the TM case. In particular, first, by assuming that the magnetic field H and electric field E have a similar form to that of the electric field E in equation (19) and the magnetic field H in equation (20), second, by plugging this into the Maxwell's equations equation (17), and, third, by forcing the boundary condition at z=h, the following dispersion equation for the SPP wave vector $k_{spp}$ can be found according to:

$$\sqrt{k_{spp}^2 - \frac{\omega^2}{c_0^2}\epsilon_1} + \sqrt{k_{spp}^2 - \frac{\omega^2}{c_0^2}\epsilon_2} + i\omega\mu_0 \sigma_{\alpha'\alpha'} = 0, \qquad (24)$$

where $\omega$ is the angular frequency, $\epsilon_n = \epsilon_0 \epsilon_n^r$ stands for the permeability of medium n, $c_0$ is the speed of light in vacuum, $\mu_0$ is the permittivity of the medium n, and $\sigma_{\alpha'\alpha'}$ is the AGNR conductivity for $\alpha'$-polarized waves given by equation (8). Moreover, a closed-form expression for $k_{spp}$ can be found in this case, $$k_{spp} = \frac{\omega}{c_0}\sqrt{\epsilon_1^r - \left(\frac{(\epsilon_1^r - \epsilon_2^r) + \sigma_{\alpha'\alpha'}^2 \eta_0^2}{2\sigma_{\alpha'\alpha'} \eta_0}\right)^2}, \qquad (25)$$

where $\eta_0 = \mu_0/\epsilon_0$. Next, we numerically investigate the propagation of SPP TE modes in AGNRs.

Plasmonic Nano-antenna Theory. Plasmonic nano-antennas differ largely from classical metallic antennas. The main differences between plasmonic nano-antennas and metallic antennas are summarized as follows:

Finite Complex Conductivity: In classical antenna theory, a common assumption is to model the material of the antenna building components as Perfect Electrical Conductor (PEC), i.e., as a material with infinite conductivity, $\sigma PEC \to \infty$. This assumption simplifies the analytical study of the antenna by forcing the field inside the antenna $\vec{E}^{in}$ to be zero. If the field were non-zero, the current inside the antenna would tend to infinite, $\vec{J}^{in} \to \infty$, as defined by the Ohm's law equation (8). Since infinite currents are not allowed, $\vec{E}^{in}$ is required to be zero. On the other hand, a finite complex conductivity is required for the propagation of SPP waves, as given by equations (23) and (24). Moreover, this conductivity drastically changes with the size or chemical potential of the material.

Plasmonic Current Wave: In classical antenna theory, the electrical current wave traveling along a PEC antenna propagates at the speed of light in vacuum $c_0$ with wave vector $k_0$. On the other hand, the electrical current wave traveling along a plasmonic antenna propagates at the much lower SPP wave propagation speed with wave vector $k_{spp}$. Moreover, it is known that a plasmonic nano-antenna cannot support an additional current which propagates with $k_0$. This much slower propagation of the current wave is what allows the reduction of the physical antenna size in accordance with the SPP wave compression factor $\text{Re}\{k_{spp}\}/k_1$, given by equation (16). The wave vector of SPP waves depends strongly on the type of SPP modes and the size and chemical potential of the plasmonic nano-structure.

As a result of these two main differences, many other implications affect the design of plasmonic nano-antennas. For example, in classical antenna theory, when considering PEC materials, the resonant frequency of the fundamental dipole antenna depends only its length. However, for a plasmonic antenna, the resonant frequency of a nanowire-based dipole antenna depends also on the temperature, chemical potential or radius of the wire, due to the impact of these parameters in its conductivity. This can be extrapolated to other types of plasmonic nano-antennas.

Frequency Response of Plasmonic Nano-antennas. We model the graphene-based nano-antenna as a plasmonic nanostrip antenna. At the microscale, microstrip antennas (also known as planar antennas or printed antennas) have been widely used in many applications due to their simple manufacture, compatibility with planar circuitry, low profile, planar structure, and unidirectional radiation. The two dimensional nature of graphene makes it, at least intuitively, a perfect candidate to port the advantages of microstrip antennas to the nanoscale. Contrary to carbon nanotube-based antennas or nano-wire-based antennas, the planar geometry of graphene can ease the integration of nano-antennas in advanced nano-devices with diverse applications, such as, biological and chemical nanosensor networks or optical interconnects in advanced multi-core computing architectures.

In order to analyze the frequency response of nano-strip antennas, we model the graphene-based heterostructure composed of the AGNR, the dielectric material and the ground plane, as a plasmonic resonant cavity. This imposes a condition of the AGNR length L for the antenna to resonate. Up to this point, we have analyzed the impact of the finite width W of the AGNR on its conductivity and on the propagation of SPP waves, while considering the length L of the AGNR to tend to infinite or, at least, to be much larger than W, $$L \gg W \gg h, \quad (26)$$

where h is the dielectric high. The conductivity of AGNRs tends to that of infinitely large graphene sheets as the width W increases. For example, for W=50 nm, the impact of the lateral confinement of electrons in the y-axis on the conductivity along the x-axis is almost negligible. Therefore, the length L of the AGNR does not impact the conductivity as long as we consider it to be in the order of a few hundreds nanometers. Similarly, the dispersion of SPP modes in AGNRs given by equations (23) and (14) is determined by the permittivity of the surrounding media and the conductivity of the AGNR, but not by its length L. However, for the plasmonic nano-antenna to resonate, there is an additional constraint on the AGNR length, which depends on the type of SPP modes propagating along the antenna.

TM Modes. The condition on the nano-strip length L for a TM SPP wave mode to propagate along the x-axis is:

$$L = m\frac{\lambda_{spp}}{2} = m\frac{\pi}{\text{Re}\{k_{spp}\}} \quad (27)$$

where m=1,2, ..., and $\lambda_{spp}$ and $k_{spp}$ refer to the SPP wavelength and SPP wave vector, respectively. The SPP wave vector $k_{spp}$ in equation (23) depends on the AGNR width W and chemical potential $\mu$. As a result, the resonant length L of the antenna, or inversely, the resonant frequency of a fixed length L AGNR depends also on these two parameters. Note the difference with classical metallic antennas, in which the wave vector in the vacuum $k_0$ (or an equivalent effective wave vector $k_{\mathit{eff}}$ which captures the impact of the dielectric and the ground plane) is used instead of the SPP wave vector $k_{spp}$.

SPP TM modes only exist at specific frequencies for which the imaginary part of the dynamic complex conductivity $\sigma_{xx}$ is positive. For the frequencies that the TM mode exists, the wave compression factor $\text{Re}\{k_{spp}\}/k_1$ allows for a much shorter L than that of classical metallic antennas. For example, an antenna with L=1 μm and W=2.1 nm, at μ=0.3 eV and T=300 K, approximately radiates at 8.5 THz. This is 35 times shorter than the size required for a metallic antenna operating at the same frequency.

TE Modes. The condition on the nano-strip length L for a TE SPP wave mode to propagate along the x-axis is $$L = \frac{2q-1}{\sqrt{\left(\frac{2p-1}{W}\right)^2 - \left(\frac{2}{\lambda_{spp}}\right)^2}} = \frac{(2q-1)\pi}{\sqrt{\left(\frac{(2p-1)\pi}{W}\right)^2 - \text{Re}\{k_{spp}\}^2}} \quad (28)$$

where p,q=1,2, ..., and $k_{spp}$ and $k_{spp}$ are the SPP wavelength and wave vector for TE SPP modes, respectively. The SPP wave vector $k_{spp}$ given by equation (24) depends on the AGNR width W and chemical potential $\mu$. Therefore, there is a double dependence on the width W when determining the resonant length of TE modes in nano-strip antennas. The resonant antenna length L for TE modes is a function of the frequency. However, as expected from equation (28), much higher frequencies are needed to actually see the impact of the length on the TE mode. Alternatively, much wider nano-strips can be considered, but in that case, rather than AGNRs, we would require the use of much larger graphene sheets.

The propagation length of the SPP modes in graphene given by $1/\text{Im}\{k_{spp}\}$ is on the order of a few SPP wavelengths $\lambda_{spp}$ which seems somehow desirable for the radiation from graphene-based heterostructures. However, the radiation principle itself might differ largely with the AGNR width. For example, for relatively wide nano-patches, it is common to model the antenna as four magnetic currents, one in each edge, two of them being radiative and two of them resulting in non-radiative.

The propagation wave vector of SPP waves in graphene can be up to two orders of magnitude above the propagation wave vector in vacuum. This can be exploited to design plasmonic nano-antennas, as we firstly proposed in. The main difference between a metallic antenna and a plasmonic antenna is that the equivalent electrical size of a plasmonic antenna is much larger than its physical dimensions, due to the much lower speed of SPP waves in the plasmonic antenna compared to that of free-space EM waves in classical antennas. This results in much more compact antennas which can be integrated into nano-devices. Plasmonic antennas are not a new concept, but have been investigated before. The main difference between classical plasmonic antennas and graphene-based plasmonic antennas is that SPP waves in graphene are observed at frequencies in the terahertz band, i.e., two orders of magnitude below SPP waves observed in gold and other noble materials. In addition, graphene SPP waves can be tuned by material doping, which opens the door to tunable nano-antennas. By exploiting the behavior of SPP waves in GNRs, miniature graphene-based plasmonic nano-antennas are able to operate at much lower frequencies than their metallic counterparts. For example, a one-micrometer-long few nanometers-wide nano-antenna is expected to radiate in the terahertz band. This makes graphene-based nano-antennas a promising enabling technology for EM communication in nanonetworks.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An antenna system, comprising:
    (a) an elongated conductive plane;
    (b) an elongated dielectric layer disposed on the conductive plane;
    (c) an elongated graphene nanoribbon disposed along an axis and coupled to the dielectric layer at a graphene/dielectric interface; and
    (d) a feeding mechanism, coupled to the conductive plane, configured to accept a signal that excites surface plasmon polariton waves at the graphene/dielectric interface.

2. The antenna system of claim 1, wherein the elongated conductive plane comprises a metal that acts as a conductor when a signal with a frequency in a terahertz band is applied thereto.

3. The antenna system of claim 2, wherein the metal comprises a metal selected from a group of metals consisting of: gold, platinum and combinations thereof.

4. The antenna system of claim 1, wherein the graphene nanoribbon is doped with a dopant so as to tune the antenna system to a predetermined surface plasmon polariton wave frequency.

5. A communication system, comprising:
    (a) an elongated conductive plane;
    (b) an elongated dielectric layer disposed on the conductive plane;
    (c) an elongated graphene nanoribbon disposed along an axis and coupled to the dielectric layer at a graphene/dielectric interface;
    (d) a feeding mechanism, coupled to the conductive plane; and
    (e) a signal source coupled to the feeding mechanism and configured apply energy to the conductive plane so as to excite surface plasmon polariton waves at the graphene/dielectric interface.

6. The communication system of claim 5, wherein the elongated conductive plane comprises a metal that acts as a conductor when a signal with a frequency in a terahertz band is applied thereto.

7. The communication system of claim 6, wherein the metal comprises a metal selected from a group of metals consisting of: gold, platinum and combinations thereof.

8. The communication system of claim 5, wherein the graphene nanoribbon is doped with a dopant so as to tune the communication system to a predetermined surface plasmon polariton wave frequency.

9. A method of making a surface plasmon polariton wave antenna, comprising the steps of:
    (a) forming an elongated conductive plane;
    (b) applying an elongated dielectric layer on a surface of the conductive plane;
    (c) applying an elongated graphene nanoribbon to the dielectric layer; and
    (d) coupling a signal source to the elongated conductive plane.

10. The method of claim 9, further comprising the step of adding a dopant to the elongated nanoribbon so as to tune the elongated nanoribbon to a preselected surface plasmon polariton wave frequency.

11. The method of claim 9, wherein the elongated conductive plane comprises a metal that acts as a conductor when a signal with a frequency in a terahertz band is applied thereto.

12. The method of claim 11, wherein the metal comprises a metal selected from a group of metals consisting of: gold, platinum and combinations thereof.

* * * * *